US012560142B2

(12) United States Patent
Delleree et al.

(10) Patent No.: US 12,560,142 B2
(45) Date of Patent: Feb. 24, 2026

(54) TURBULENT JET IGNITION ENGINE MISFIRE DETECTION

(71) Applicant: FCA US LLC, Auburn Hills, MI (US)

(72) Inventors: Matthew Delleree, Brighton, MI (US);
Roger C Sager, Munith, MI (US);
Rebecca M Riley, Howell, MI (US);
Steve Wante, Edgewater, FL (US);
Nithin Baradwaj, Ann Arbor, MI (US);
Mary M Arito, West Lafayette, IN
(US)

(73) Assignee: FCA US LLC, Auburn Hills, MI (US)

( * ) Notice: Subject to any disclaimer, the term of this
patent is extended or adjusted under 35
U.S.C. 154(b) by 337 days.

(21) Appl. No.: 18/476,550

(22) Filed: Sep. 28, 2023

(65) Prior Publication Data

US 2025/0109729 A1 Apr. 3, 2025

(51) Int. Cl.
*G01M 15/11* (2006.01)
*F02P 9/00* (2006.01)
*F02P 17/12* (2006.01)

(52) U.S. Cl.
CPC ................. *F02P 17/12* (2013.01); *F02P 9/00*
(2013.01); *G01M 15/11* (2013.01)

(58) Field of Classification Search
CPC ............. F02P 17/12; F02P 9/00; G01M 15/11
See application file for complete search history.

(56) References Cited

U.S. PATENT DOCUMENTS

| | | | | |
|---|---|---|---|---|
| 6,559,647 B1 * | 5/2003 | Bidner | ................... | F02P 17/00 |
| | | | | 324/393 |
| 12,378,937 B1 * | 8/2025 | McMeekin | ............. | F02P 9/002 |
| 2025/0244207 A1 * | 7/2025 | Baldwin-Squibb | ..... | F02P 15/02 |

* cited by examiner

*Primary Examiner* — Freddie Kirkland, III

(74) *Attorney, Agent, or Firm* — Jeremy J. Klobucar

(57) ABSTRACT

A method for detecting a source of a misfire for an engine
having turbulent jet ignition (TJI) during a service routine is
presented. A diagnostic tool is coupled to an engine con-
troller of the TJI engine. An increase in revolutions per
minute (RPM) of the TJI engine is commanded. An engine
roughness is measured and a baseline engine roughness for
the TJI engine while all cylinders are in an active state is
established. A first main spark plug is commanded to deac-
tivate. A first test engine roughness of the TJI engine is
measured based on the first main spark plug being deacti-
vated. The baseline engine roughness is compared to the first
test engine roughness. A determination is made, based on the
comparison, whether the first pre-chamber is fouled.

15 Claims, 3 Drawing Sheets

TURBULENT JET IGNITION ENGINE MISFIRE DETECTION

FIELD

The present application generally relates to spark ignition (SI) engines and, more particularly, to techniques for detecting a source of a misfire for an engine having turbulent jet ignition (TJI) during a service routine.

BACKGROUND

In today's internal combustion engines, the spark timing with respect to the respective piston strokes affects the quality of combustion. It is therefore desirable to accurately determine and control the spark timing because poor combustion quality due to inaccurate spark timing could result in decreased fuel economy and/or engine knock. An internal combustion engine that incorporates turbulent jet ignition (TJI) includes a pre-chamber with a first spark plug inside and installed generally in the center of the cylinder head. A second spark plug is mounted in an offset position in the main combustion chamber. The pre-chamber typically connects to the main combustion chamber with multiple passages. Flame is initiated inside the pre-chamber and jets into the main combustion chamber to ignite the bulk fuel air mixture.

With a turbulent jet ignition (TJI) engine, there exists both a pre-chamber (PC) ignition from the first spark plug and a secondary ignition in a main combustion chamber (MC) from the second spark plug. In this regard, both the pre-chamber and the secondary ignition timings have an influence on torque efficiency. When a TJI engine is running rough due to a fouled pre-chamber, it can be difficult to easily identify which pre-chamber is the source. Accordingly, there remains a need for improvement in the relevant art to identify, such as during a service routine, a fouled pre-chamber in a TJI engine.

SUMMARY

According to one example aspect of the invention, a method for detecting a source of a misfire for an engine having turbulent jet ignition (TJI) during a service routine is presented. A diagnostic tool is coupled to an engine controller of the TJI engine. An increase in revolutions per minute (RPM) of the TJI engine is commanded. An engine roughness is measured and a baseline engine roughness for the TJI engine while all cylinders are in an active state is established. A first main spark plug is commanded to deactivate. A first test engine roughness of the TJI engine is measured based on the first main spark plug being deactivated. The baseline engine roughness is compared to the first test engine roughness. A determination is made, based on the comparison, whether the first pre-chamber is fouled.

According to some implementations, the TJI engine comprises at least (i) a first cylinder having a first main spark plug and a first pre-chamber having a first pre-chamber spark plug; and (ii) a second cylinder having a second main spark plug and a second pre-chamber having a second pre-chamber spark plug.

According to another example aspect of the invention, the first main spark plug is activated based on a determination that the first pre-chamber is not fouled. The second main spark plug is commanded to deactivate. A second test engine roughness of the TJI engine is measured based on the second main spark plug being deactivated. The baseline engine roughness is compared to the second test engine roughness. A determination is made, based on the comparison, whether the second pre-chamber is fouled.

According to another example aspect of the invention, the TJI engine further comprises at least a (iii) third cylinder having a third main spark plug and a third pre-chamber having a third pre-chamber spark plug. The second main spark plug is activated based on a determination that the second pre-chamber is not fouled. The third main spark plug is commanded to deactivate. A third test engine roughness of the TJI engine is measured based on the third main spark plug being deactivated. The baseline engine roughness is compared to the third test engine roughness. A determination is made, based on the comparison, whether the third pre-chamber is fouled.

According to another example aspect of the invention, the TJI engine further comprises at least a (iv) fourth cylinder having a fourth main spark plug and a fourth pre-chamber having a fourth pre-chamber spark plug. The third main spark plug is activated based on a determination that the third pre-chamber is not fouled. The fourth main spark plug is commanded to deactivate. A fourth test engine roughness of the TJI engine is measured based on the fourth main spark plug being deactivated. The baseline engine roughness is compared to the fourth test engine roughness. A determination is made, based on the comparison, whether the fourth pre-chamber is fouled.

In other features, a determination is made whether enable conditions are met, wherein enable conditions comprise one of an engine temperature threshold, an idle speed target threshold, a fuel level threshold, known spark degrees satisfied, and no open fault codes for the engine.

According to some implementations, the method further includes elevating a crankshaft velocity term, the crankshaft velocity term comprising a second derivative of the RPM's of the engine. The measured engine roughness is filtered prior to establishing a baseline engine roughness for the TJI engine.

According to other implementations, the method further includes determining, based on the comparison, whether the first pre-chamber is fouled comprises determining that at least one of the first pre-chamber and the first pre-chamber spark plug are fouled. A diagnostic tool identifies which of the first, second third and fourth pre-chambers are fouled.

According to another example aspect of the invention, a method for detecting a source of a misfire for an engine having turbulent jet ignition (TJI) during a service routine is presented. An increase in revolutions per minute (RPM) of the TJI engine is commanded. An engine roughness is measured and a baseline engine roughness for the TJI engine while all cylinders are in an active state is established. A first main spark plug is commanded to deactivate. A first test engine roughness of the TJI engine is measured based on the first main spark plug being deactivated. The baseline engine roughness is compared to the first test engine roughness. A determination is made, based on the comparison, whether the first pre-chamber is fouled.

According to some implementations, the TJI engine comprises at least (i) a first cylinder having a first main spark plug and a first pre-chamber having a first pre-chamber spark plug; and (ii) a second cylinder having a second main spark plug and a second pre-chamber having a second pre-chamber spark plug.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, when a TJI engine is running rough due to a fouled pre-chamber, it can be difficult to easily identify which pre-chamber is the source. In other words, it is difficult to isolate the cylinders of the TJI engine to properly identify the fouled pre-chamber (PC) or PC spark plug. The present disclosure provides a diagnostic method that allows a service technician to run an intrusive service tool initiated routine to pinpoint and isolate the faulted cylinder's PC system. Once the faulted PC has been identified, service operations can be performed to correct the issue in an efficient manner.

Figures 1, 2:
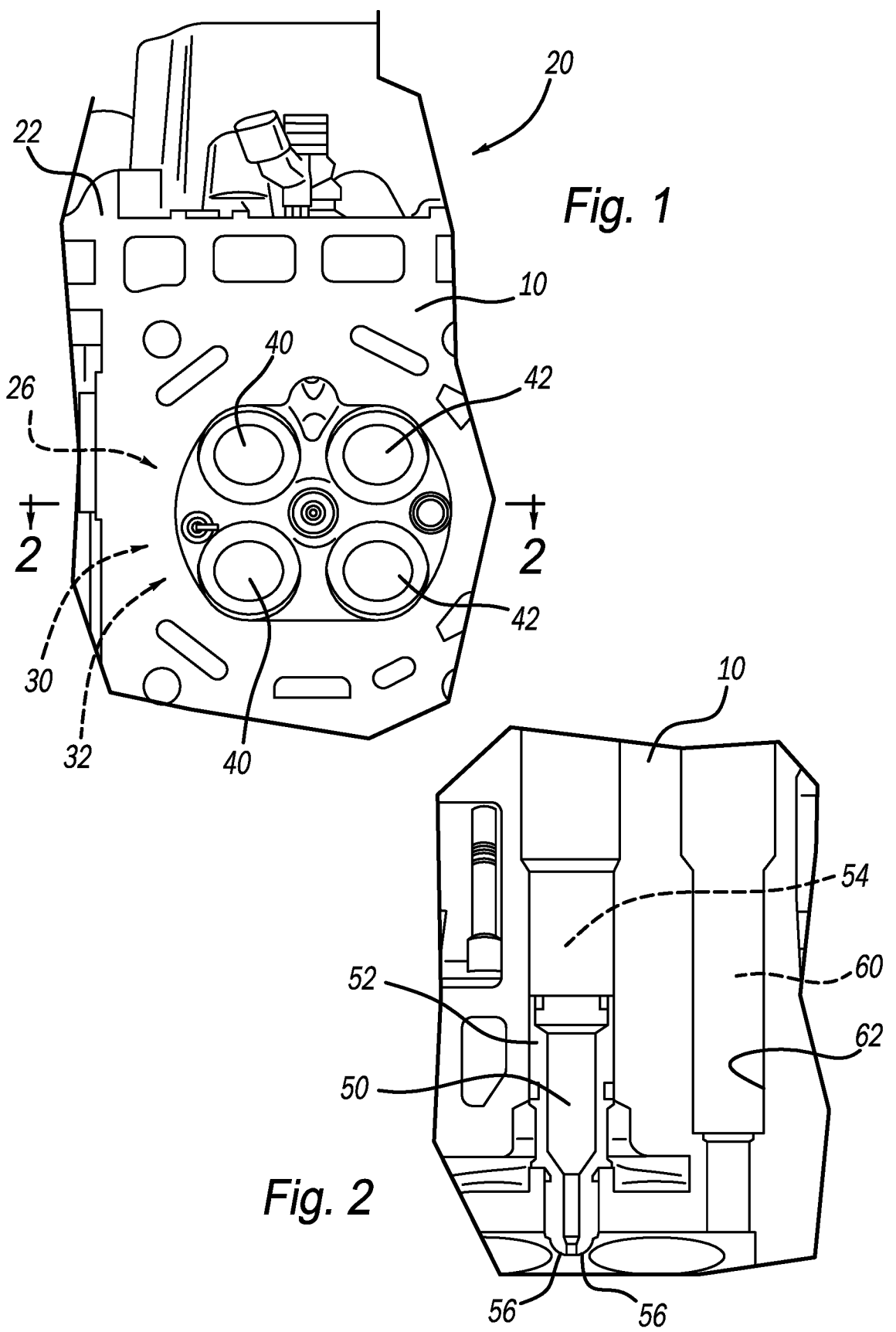
FIG. 1 is an elevational view of a cylinder head of an exemplary TJI engine according to the principles of the present disclosure.
FIG. 2 is a cross-sectional view taken along lines 2-2 of FIG. 1.

With initial reference to FIGS. 1 and 2, an exemplary cylinder head is shown and generally identified at reference numeral 10. The cylinder head 10 is incorporated into an internal combustion engine 20 having an engine block 22 incorporating one or more cylinders 26. A piston 30 is supported for reciprocal movement within a cylinder 26 defined in the engine block 22. The cylinder head 10, cylinder 26 and piston 30 cooperate to define a combustion chamber 32. The exemplary internal combustion engine 20 includes two intake ports 40 and two exhaust ports 42. As is known, the intake and exhaust ports 40 and 42 open and close via valves to provide fluid communication between the cylinder and the intake manifold and the exhaust manifold (not specifically shown). It will be appreciated that while two intake ports 40 and two exhaust ports 42 are shown, the internal combustion engine 20 may incorporate any number of intake and/or exhaust valves. By way of example only the engine block 22 can be configured to have four cylinders. It will be appreciated that the methods and control strategies discussed herein can be applicable to TJI engines having different amounts of cylinders.

The cylinder head 10 includes a pre-chamber 50 having a pre-chamber insert 52 disposed therein. A first ignition device or pre-chamber spark plug 54 is disposed in the pre-chamber 50. The pre-chamber insert 52 defines a plurality of small orifices 56 defined therein. The orifices 56 provide communication between the pre-chamber 50 and the combustion chamber 32. An injector, not specifically shown, can deliver fuel into the pre-chamber 50. The first spark plug 54 can ignite the fuel in the pre-chamber 50. The pre-chamber 50 is a small volume outside of a typical combustion chamber where combustion can be initiated with a dedicated spark plug. Hot gasses expel from the pre-chamber 50 and propagate through the main combustion chamber, driving combustion in the cylinder 26.

A second ignition device or second spark plug 60 is disposed in an adjacent cavity, or main chamber 62 provided on the cylinder head 10. In some implementations the second spark plug 60 can be referred to as a side spark plug. Once ignited, the fuel is forced through the orifices 56 of the pre-chamber insert 52. Flame is initiated inside the pre-chamber 50 and jets into the main combustion chamber 32 to ignite the bulk fuel air mixture.

It is possible that fouling can occur on either the dedicated pre-chamber spark plug 54, or the pre-chamber orifices 56 themselves, therefore not allowing pre-chamber combustion to initiate or propagate into the main chamber 62. The instant disclosure provides an intrusively-induced diagnostic routine (such as implemented with a diagnostic tool by a technician during a service visit). The routine elevates the speed of the engine 20 to a condition where the pre-chamber can drive stable combustion of the engine 20 without the assistance of the second or main spark plug 60. During the test routine, and after engine speed is elevated, the routine will iteratively deactivate the main spark plug 60, such that if a fouled pre-chamber spark plug 54 or fouled pre-chamber 50 exists, the engine 20 will exhibit full loss of combustion in the offending cylinder(s).

When the main spark plug 60 is deactivated, the routine will compare a calculated engine speed "roughness" to a calibrated threshold. If the pre-chamber 50 is fouled or inoperable, the engine speed "roughness" will exceed the threshold, indicating the pre-chamber 50 is in an inoperable state. The routine will then report, such as to a service technician, which cylinder or cylinders do not appear to be operating correctly. The service technician will then be able to pinpoint the inoperable pre-chamber 50 and/or pre-chamber spark plug 54 and conduct the appropriate service procedures.

Figure 3:
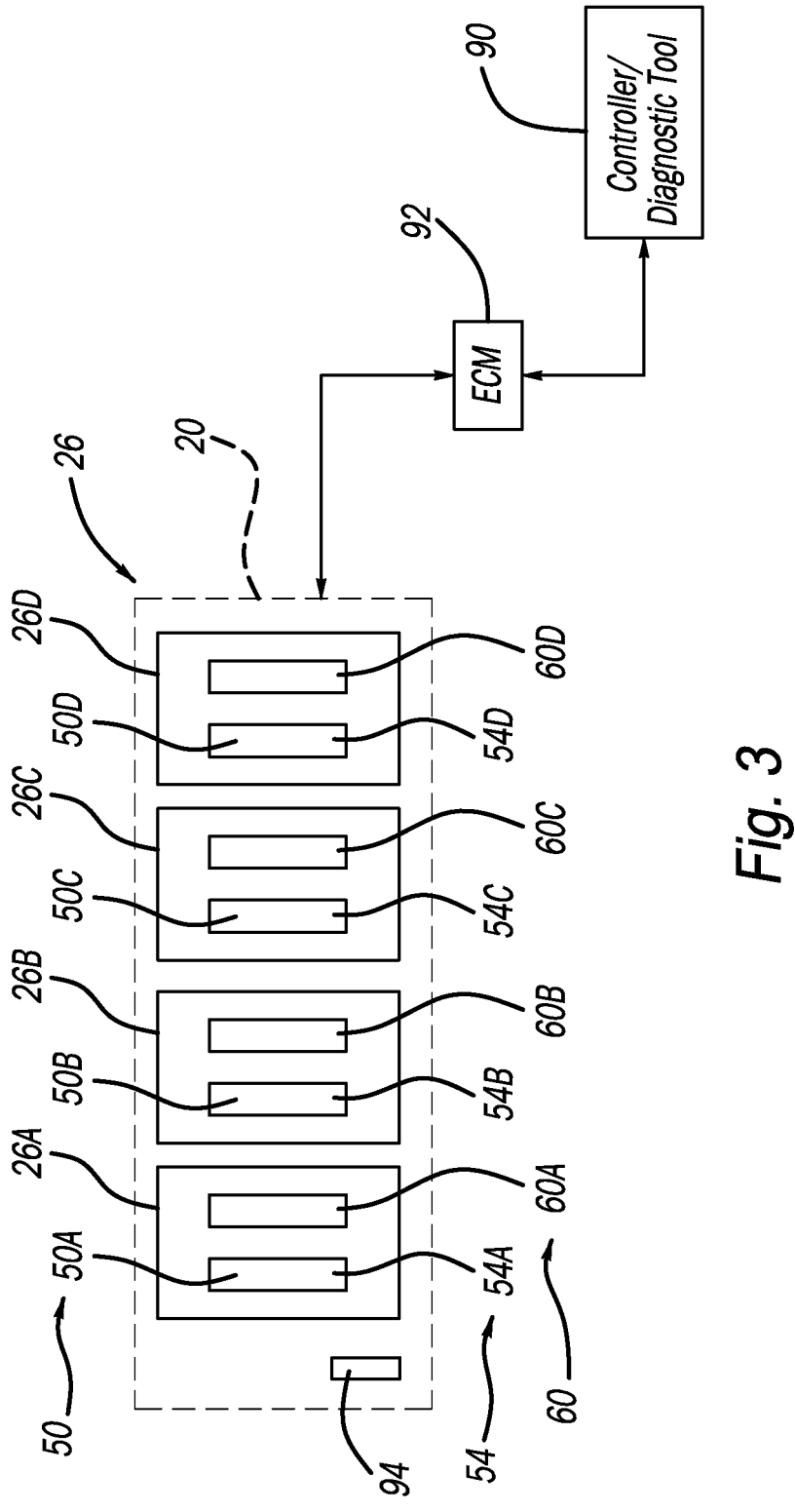
FIG. 3 is a schematic representation of all cylinders of the TJI engine of FIG. 1.
Figure 4:
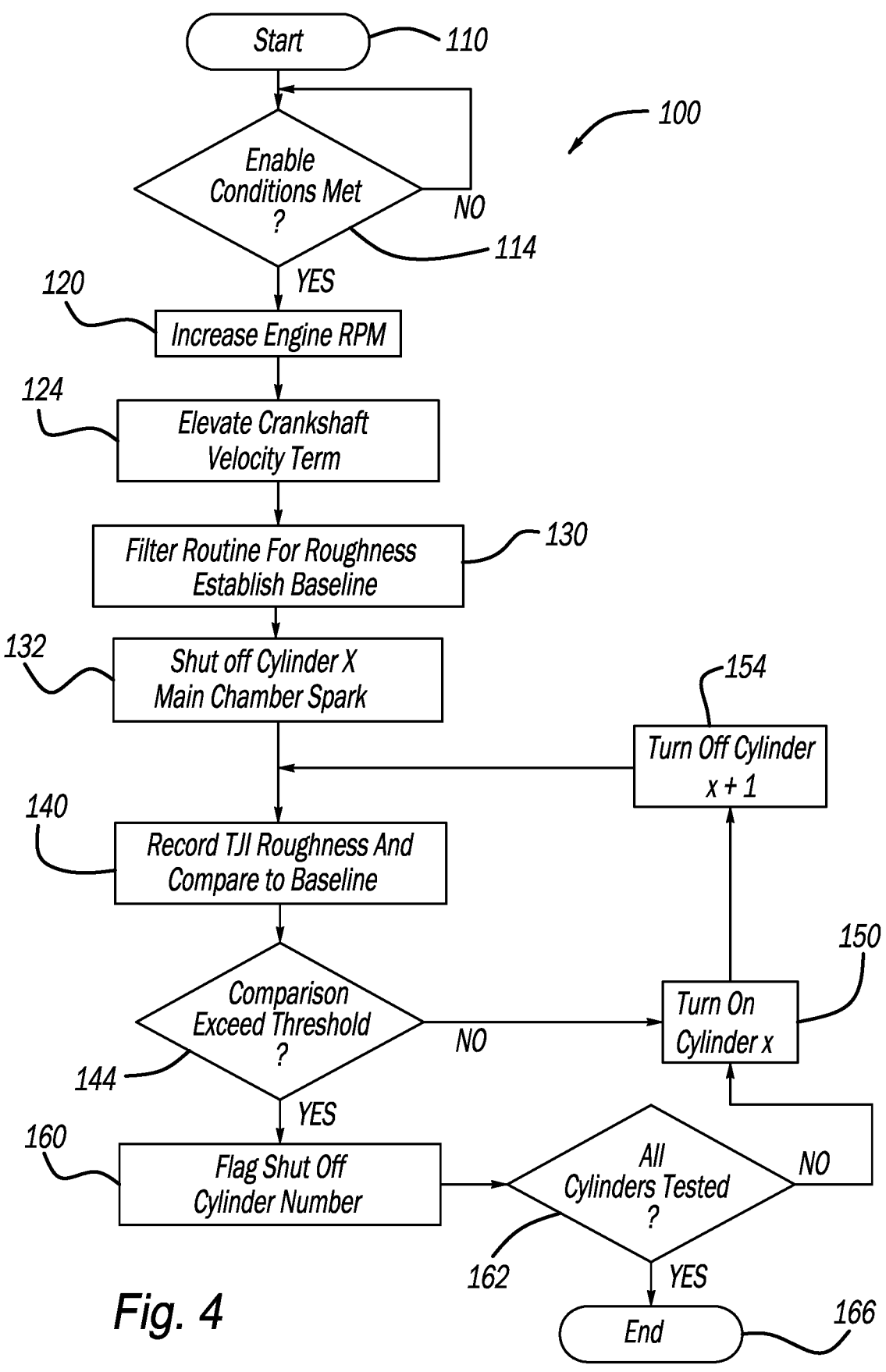
FIG. 4 is a flow diagram of an example method of identifying a fouled pre-chamber during a service routine according to the present disclosure.

With additional reference now to FIGS. 3 and 4, a method for determining a misfire for an engine 20 having turbulent jet ignition (TJI) to pinpoint and isolate a faulted pre-chamber 50 during a service routine is shown and generally identified at reference numeral 100. In general, the method 100 represents an in-field diagnostic sequence that can be performed when a suspected failure in a pre-chamber 50 exists. As shown in FIG. 3, a controller or diagnostic tool 90 can be connected to the engine 20, or through an engine control module 92 (and/or a powertrain control module) of the engine 20. The diagnostic tool 90 can initiate the method 100 in the engine 20 through the ECM 92.

The suspected failure can represent a failure in the pre-chamber 50 itself, and/or in the pre-chamber spark plug 54. In this regard, a failure can be defined as a combustion not being satisfactorily initiated in the pre-chamber 50. Again, with existing diagnostic tool technologies, there is no pinpointing of the particular pre-chamber 50 causing the failure. In other words, and as shown in FIG. 3, the pre-chambers, for an exemplary four cylinder engine, are collectively identified at 50 and individually identified at 50A, 50B, 50C, and 50D. Further, the pre-chamber spark plugs are collectively identified at 54 and individually identified at 54A, 54B, 54C and 54D. The main spark plugs are collectively identified at 60 and individually identified at 60A, 60B, 60C and 60D. Each cylinder, collectively identified at 26 and individually identified at 26A, 26B, 26C and 26D includes each of a respective pre-chamber spark plug 54A, 54B, 54C and 54D and a main spark plug 60A, 60B, 60C and 60D.

The method discussed herein determines which of the pre-chambers 50A, 50B, 50C or 50D is the offending or failed pre-chamber. It will be appreciated that an offending or failed pre-chamber is defined herein as either a pre-chamber 50 or a corresponding pre-chamber spark plug 54 working improperly. An improperly working pre-chamber spark plug 54 can be a spark plug 54 that is not initiating combustion. An improperly working pre-chamber 50 can be a pre-chamber 50 that is working improperly such as has fouled orifices 56 not allowing proper exchange of gases to occur. Either of these improperly working conditions can result in a misfire in the identified cylinder.

The method 100 elevates the revolutions per minute (RPM) of the engine 20 and iteratively deactivates the main spark plugs 60A, 60B, 60C and 60D such that if a failure of a pre-chamber 50A, 50B, 50C and 50D is present, the offending pre-chamber 50A, 50B, 50C and 50D is identified. The method 100 begins at 110. At 114, control determines whether enable conditions are met. Enable conditions can include, one of an engine temperature, an idle speed target, a fuel level, known spark degrees satisfied, no open fault codes. Other enable conditions may be additionally or alternatively included. If the enable conditions are not met, control loops to 114. If the enable conditions are met, control increases the RPM of the engine 20 at 120. At 124, control evaluates a velocity of a crankshaft 94 of the engine 20. In examples, the crankshaft velocity can be a second derivative of engine speed. In this regard, instantaneous jerk acceleration of the crankshaft 94 is evaluated. Assuming there is a failure in one of the pre-chambers 50A, 50B, 50C and 50D, a large amount of variation in engine speed is observed as the offending cylinder misfires.

At 130, the roughness is filtered using a plurality of calculated results to remove any instantaneous noise. At 130 a baseline roughness is established for the engine 20 while operating all cylinders 26. Calculations are made for each cylinder 26A, 26B, 26C and 26D for a given timeframe. The timeframe can be any suitable timeframe such as 10 seconds or longer.

At 132 each of the main spark plugs 60A, 60B, 60C and 60D for each respective cylinder 26A, 26B, 26C and 26D is sequentially deactivated. An evaluation is made of the roughness when each cylinder 26A, 26B, 26C and 26D is deactivated. During normal engine operation, the main spark plugs 60A, 60B, 60C and 60D drive combustion. Because the engine 20 is operating at elevated RPM due to step 120, the pre-chamber spark plugs 54A, 54B, 54C and 54D of the pre-chambers 50A, 50B, 50C and 50D are able to deliver stable combustion (without needing spark from the main spark plugs 60A, 60B, 60C and 60D). By specifically deactivating a main spark plug 60, a working pre-chamber 50 would tend to overcome the deactivated main spark plug and maintain a consistent engine RPM (similar roughness). If a main spark plug 60 is deactivated, but the corresponding pre-chamber 50 is failed, the cylinder 26 will misfire and a measured roughness will be significantly elevated compared to a baseline and the offending pre-chamber 50 can be flagged.

If the pre-chamber 50A, 50B, 50C and/or 50D is not operable or failed, a misfire would be observed. Explained further, the main spark plug 60A is deactivated and an engine roughness is measured. At 140, the engine roughness during operation with the main spark plug 60A off (deactivated) is compared to the baseline roughness (developed with all cylinders operating). If the pre-chamber 50A is working properly, the engine roughness measured with the main spark plug 60A deactivated should be near the baseline roughness with all cylinders operating (due to the pre-chamber 50A and pre-chamber spark plug 54A sufficiently providing combustion of the cylinder 26A in the absence of the deactivated main spark plug 60A). If one of the pre-chamber 50A and pre-chamber spark plug 54A are fouled, and the main spark plug 60A has been purposely deactivated, combustion cannot be achieved and the measured engine roughness (compared to the baseline) is noticeable. At 144 control determines whether the recorded TJI roughness of the engine operating with an identified cylinder deactivated compared to the baseline roughness exceeds a threshold. If the recorded TJI roughness does not exceed a threshold (indicative of a properly working pre-chamber), control turns back on the cylinder (in this example, main spark plug 60A) at 150 and turns off a next cylinder (in this example, main spark plug 60B) at 154 and the process repeats through the total amount of cylinders. If the comparison at 144 exceeds the threshold, control flags the shut off cylinder number at 160. At 162 control determines whether all cylinders have been tested. If yes, control ends at 166. If no, control loops to 150. In examples, the diagnostic tool 90 can identify which of the first, second, third and fourth pre-chamber 50A, 50B, 50C and 50D is fouled recognizing that more than one pre-chamber 50A, 50B, 50C and 50D can be fouled.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method for detecting a source of a misfire for an engine having turbulent jet ignition (TJI) during a service routine, the method comprising:

coupling a diagnostic tool to an engine controller of the TJI engine, the TJI engine comprising at least (i) a first cylinder having a first main spark plug and a first pre-chamber having a first pre-chamber spark plug; and (ii) a second cylinder having a second main spark plug and a second pre-chamber having a second pre-chamber spark plug;

commanding an increase in revolutions per minute (RPM) of the TJI engine;

measuring an engine roughness and establishing a baseline engine roughness for the TJI engine while all cylinders are in an active state;

commanding a first main spark plug to deactivate;

measuring a first test engine roughness of the TJI engine based on the first main spark plug being deactivated;

comparing the baseline engine roughness to the first test engine roughness; and determining, based on the comparison, whether the first pre-chamber is fouled.

2. The method of claim 1, further comprising:

activating the first main spark plug based on a determination that the first pre-chamber is not fouled;

commanding the second main spark plug to deactivate;

measuring a second test engine roughness of the TJI engine based on the second main spark plug deactivated;

comparing the baseline engine roughness to the second test engine roughness; and determining, based on the comparison, whether the second pre-chamber is fouled.

3. The method of claim 2, wherein the TJI engine further comprises at least (iii) a third cylinder having a third main spark plug and a third pre-chamber having a third pre-chamber spark plug, the method further comprising:

activating the second main spark plug based on a determination that the second pre-chamber is not fouled;

commanding the third main spark plug to deactivate;

measuring a third test engine roughness of the TJI engine based on the third main spark plug deactivated;

comparing the baseline engine roughness to the third test engine roughness; and determining, based on the comparison, whether the third pre-chamber is fouled.

4. The method of claim 3, wherein the TJI engine further comprises at least (iv) a fourth cylinder having a fourth main spark plug and a fourth pre-chamber having a fourth pre-chamber spark plug, the method further comprising:

activating the third main spark plug based on a determination that the third pre-chamber is not fouled;

commanding the fourth main spark plug to deactivate;

measuring a fourth test engine roughness of the TJI engine based on the fourth main spark plug deactivated;

comparing the baseline engine roughness to the fourth test engine roughness; and determining, based on the comparison, whether the fourth pre-chamber is fouled.

5. The method of claim 1, further comprising:

determining whether enable conditions are met, wherein enable conditions comprise one of an engine temperature threshold, an idle speed target threshold, a fuel level threshold, known spark degrees satisfied, and no open fault codes for the engine.

6. The method of claim 1, further comprising:

elevating a crankshaft velocity term, the crankshaft velocity term comprising a second derivative of the RPM's of the engine.

7. The method of claim 6, further comprising:

filtering the measured engine roughness prior to establishing a baseline engine roughness for the TJI engine.

8. The method of claim 1, wherein determining, based on the comparison, whether the first pre-chamber is fouled comprises determining that at least one of the first pre-chamber and the first pre-chamber spark plug are fouled.

9. The method of claim 4, further comprising:

identifying, at the diagnostic tool, which of the first, second, third and fourth pre-chambers are fouled.

10. A method for detecting a source of a misfire for an engine having turbulent jet ignition (TJI) during a service routine, the TJI engine comprising at least (i) a first cylinder having a first main spark plug and a first pre-chamber having a first pre-chamber spark plug; and (ii) a second cylinder having a second main spark plug and a second pre-chamber having a second pre-chamber spark plug, the method comprising:

commanding an increase in revolutions per minute (RPM) of the TJI engine;

measuring an engine roughness and establishing a baseline engine roughness for the TJI engine while all cylinders are in an active state;

commanding a first main spark plug to deactivate;

measuring a first test engine roughness of the TJI engine based on the first main spark plug being deactivated;

comparing the baseline engine roughness to the first test engine roughness; and determining, based on the comparison, whether the first pre-chamber is fouled.

11. The method of claim 10, further comprising:

activating the first main spark plug based on a determination that the first pre-chamber is not fouled;

commanding the second main spark plug to deactivate;

measuring a second test engine roughness of the TJI engine based on the second main spark plug deactivated;

comparing the baseline engine roughness to the second test engine roughness; and determining, based on the comparison, whether the second pre-chamber is fouled.

12. The method of claim 11, wherein the TJI engine further comprises at least (iii) a third cylinder having a third main spark plug and a third pre-chamber having a third pre-chamber spark plug, the method further comprising:

activating the second main spark plug based on a determination that the second pre-chamber is not fouled;

commanding the third main spark plug to deactivate;

measuring a third test engine roughness of the TJI engine based on the third main spark plug deactivated;

comparing the baseline engine roughness to the third test engine roughness; and determining, based on the comparison, whether the third pre-chamber is fouled.

13. The method of claim 12, wherein the TJI engine further comprises at least (iv) a fourth cylinder having a fourth main spark plug and a fourth pre-chamber having a fourth pre-chamber spark plug, the method further comprising:

activating the third main spark plug based on a determination that the third pre-chamber is not fouled;

commanding the fourth main spark plug to deactivate;

measuring a fourth test engine roughness of the TJI engine based on the fourth main spark plug deactivated;

comparing the baseline engine roughness to the fourth test engine roughness; and determining, based on the comparison, whether the fourth pre-chamber is fouled.

14. The method of claim 10, wherein determining, based on the comparison, whether the first pre-chamber is fouled comprises determining that at least one of the first pre-chamber and the first pre-chamber spark plug are fouled.

15. The method of claim 10, further comprising:

identifying, at a diagnostic tool, which of the first, second, third and fourth pre-chambers are fouled.

* * * * *